United States Patent [19]
Bird

[11] Patent Number: 5,744,973
[45] Date of Patent: Apr. 28, 1998

[54] RESISTANCE TO FREQUENCY CIRCUIT FOR MEASURING AMBIENT TEMPERATURE ON A THERMOSTAT

[75] Inventor: Douglas D. Bird, Dayton, Minn.

[73] Assignee: Honeywell Inc., Minneapolis, Minn.

[21] Appl. No.: 505,831

[22] Filed: Jul. 21, 1995

[51] Int. Cl.$^6$ .......................... G01R 27/08; G05D 23/00; G01K 7/00
[52] U.S. Cl. .................. 324/707; 374/183; 236/78 R; 236/916
[58] Field of Search .............................. 324/707; 338/22; 236/78 R, 91 G; 374/183

[56] References Cited

U.S. PATENT DOCUMENTS

| | | |
|---|---|---|
| Re. 32,960 | 6/1989 | Levine. |
| Re. 33,119 | 11/1989 | Baker. |
| 3,906,391 | 9/1975 | Murdock. |
| 4,041,382 | 8/1977 | Washburn. |
| 4,125,023 | 11/1978 | Amemiya et al.. |
| 4,314,665 | 2/1982 | Levine. |
| 4,342,983 | 8/1982 | Weigand et al.. |
| 4,362,988 | 12/1982 | Weimer. |
| 4,369,352 | 1/1983 | Bowles. |
| 4,377,346 | 3/1983 | Beaver et al.. |
| 4,485,449 | 11/1984 | Knauss. |
| 4,497,586 | 2/1985 | Nelson. |
| 4,505,600 | 3/1985 | Suzuki et al.. |
| 4,625,197 | 11/1986 | Holmes. |
| 4,627,745 | 12/1986 | Rider. |
| 4,841,458 | 6/1989 | Levine et al.. |
| 4,854,723 | 8/1989 | Her. |
| 4,924,175 | 5/1990 | Clinton. |
| 5,025,248 | 6/1991 | Bergeron. |
| 5,255,975 | 10/1993 | Adams. |

FOREIGN PATENT DOCUMENTS 60-080057  5/1985  Japan.

OTHER PUBLICATIONS

Richard Friedl & Peter Seyfried, A New Resistance-to-Frequency Converter for Temperature Measurements in Calorimeters, IEEE Transactions on Instrumentation and Measurements in Calorimeters, IEEE Transactions on Instrumentation and Measurement, vol. IM-24, No. 4, Dec. 1975.

*Primary Examiner*—Vinh P. Nguyen
*Assistant Examiner*—Thomas Valone
*Attorney, Agent, or Firm*—Ian D. MacKinnon

[57] ABSTRACT

A resistance to frequency circuit for measuring the ambient temperature on a thermostat. The temperature measuring circuit comprises a first Schmitt trigger NAND gate, a rectifier, a capacitor of which one terminal is electrically connected to ground, a first resistor, a thermistor and possibly a second resistor. The capacitor is connected with the cathode electrically connected to ground, the anode is electrically connected to the first input of a NAND gate. The output of the NAND gate is electrically connected to the anode of the rectifier. The cathode of the rectifier is electrically connected to both the thermistor and the first resistor. The second terminal of the first resistor is electrically connected to the anode of the capacitor and the first input to the NAND gate. The thermistor is electrically connected to a tri-state buffer of the microprocessor. The circuit uses the open drain output ports of a microprocessor to provide the multiplexer function of the A/D. Two precision resistors are connected to the cathode of the rectifier with their second terminals electrically connected to a second and third tri-state buffer. By selectively switching through the tri-state buffers, and measuring the resulting frequencies, errors in the system can be calculated and thereby eliminated from the measured temperature of the system.

4 Claims, 2 Drawing Sheets

RESISTANCE TO FREQUENCY CIRCUIT FOR MEASURING AMBIENT TEMPERATURE ON A THERMOSTAT

BACKGROUND

The present invention relates broadly to resistance to frequency converters for temperature measurement. More specifically, the invention relates to a resistance to frequency converter for temperature measurement utilizing active calibration.

Electronics thermostats are extremely common in the current marketplace. The majority of those thermostats utilize a resistance to frequency conversion to calculate the temperature. For example, see Levine U.S. Pat. No. 4,314,665. Resistance to frequency converters are generally very accurate, can update the thermostat with the current ambient temperature quickly and require a low parts count.

In the majority of accurate resistance to frequency A/D converters utilize a comparator in the oscillator circuit to increase the accuracy of the overall system. To provide a comparator for the system requires an additional piece part at an added cost to the overall system. In today's highly competitive market additional piece parts can significantly reduce margins. An additional comparator can add up to thirty cents a device. In today's world that is a very significant expense.

This invention provides a low cost method of accurately measuring the temperature. It provides a means for active calibration which allows the use of low cost components without sacrificing temperature accuracy.

SUMMARY OF THE INVENTION

This invention is a resistance to frequency circuit for measuring the ambient temperature on a thermostat. The temperature measuring circuit comprises a first Schmitt trigger NAND gate, a rectifier, a capacitor of which one terminal is electrically connected to ground, a first resistor, a thermistor and possibly a second resistor. The capacitor is connected with the cathode electrically connected to ground, the anode is electrically connected to the first input of a NAND gate. The output of the NAND gate is electrically connected to the anode of the rectifier. The cathode of the rectifier is electrically connected to both the thermistor and the first resistor. The second terminal of the first resistor is electrically connected to the anode of the capacitor and the first input to the NAND gate. The thermistor is electrically connected to a tri-state buffer of the microprocessor.

A control signal is provided to the second input to the NAND gate. When the control signal is high, the output of the NAND gate goes high and charges the capacitor through the rectifier and the first resistor. When the capacitor sufficiently charges beyond the threshold of the Schmitt-trigger NAND gate, the output of the NAND gate goes low and the capacitor drains through the thermistor until the capacitor discharges sufficiently to toggle the NAND gate high. In this manner, the temperature detection circuit oscillates with a frequency which is dependent upon the resistance of the thermistor. The output of the NAND gate is provided to a second Schmitt-trigger device. Which is then provided to the microprocessor.

Two precision resistors are connected to the cathode of the rectifier with their second terminals electrically connected to a second and third tri-state buffer. By selectively switching through the tri-state buffers, and measuring the resulting frequencies, errors in the system can be calculated and thereby eliminated from the measured temperature of the system.

The circuit uses the open drain output ports of a microprocessor to provide the multiplexer function of the A/D. Many microprocessor provide open drain outputs which can be used for this function.

By using two channel calibration there is an increase in the accuracy of the system allowing for the use of a NAND gate in place of a comparator. Further the NAND gate is essentially costs nothing because multiple NAND gates are placed on a chip and they are used elsewhere in the device. This is a cost savings of significant proportions, by eliminating the comparator.

DESCRIPTION OF THE PREFERRED EMBODIMENT

Figure 1:
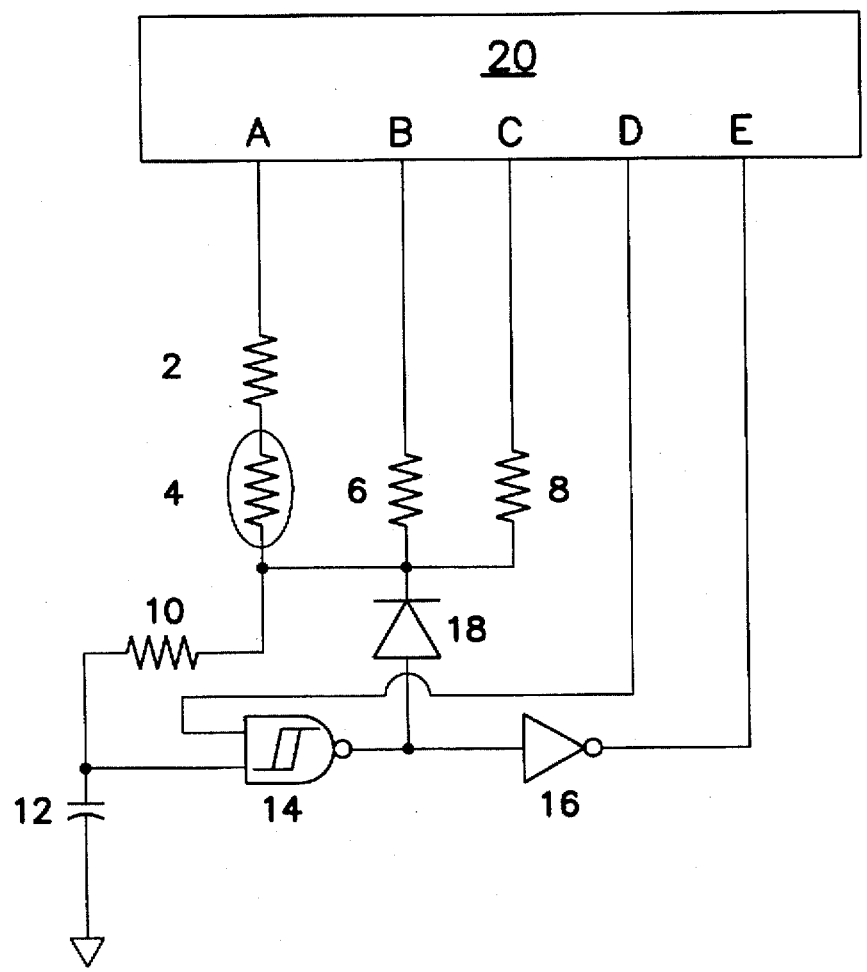
FIG. 1 is the schematic diagram of a first embodiment of preferred embodiment of the invention.

The preferred embodiment of FIG. 1 comprises a microprocessor 20 with a plurality of tri-state inputs, an input node and an output node. Microprocessor 20, for the preferred embodiment, has a first tri-state input node A, a second tri-state input node B, and a third tri-state input node C. For the preferred embodiment microprocessor 20 is a Sanyo LC5868H micro-controller. Control node D provides a enabling pulse to NAND gate 14. Input node E is provided with the output from inverter 16. The resistance to frequency A/D circuit comprises NAND gate 14, inverter 16, rectifier 18, thermistor 4, resistors 2, 6, 8 and 10, and capacitor 12. NAND gate 14 is a "Schmitt trigger" NAND gate. Resistors 6 and 8 are the calibration resistors and are precision resistors.

Capacitor 12 has an anode and a cathode. The cathode is electrically connected to ground and the anode is electrically connected to the first input of NAND 14 and the first terminal of resistor 10. The input node D from microprocessor 20 is electrically connected to the second input of NAND gate 14. The output of NAND gate 14 is provided to inverter 16 and the anode of rectifier 18. The cathode of rectifier 18 is electrically connected to the second terminal of resistor 10, the first terminal of thermistor 4, the first terminal of resistor 6, and the first terminal of resistor 8. The second terminal of thermistor 4 is electrically connected to the first terminal of resistor 2. The second terminal of resistor 2 is electrically connected to input node A of microprocessor 20. The second terminal of resistor 6 is electrically connected to the input terminal B of microprocessor 20. The second terminal of resistor 8 is electrically connected to input node C of microprocessor 20. Input nodes A, B and C of microprocessor 20 are tri-state nodes and for the preferred embodiment are either set in a high-impedance mode or are set to ground. In this manner, microprocessor 20 can select which resistor, the combination of thermistor 4 and resistor 2, or resistor 6 or resistor 8 controls the oscillation frequency of the circuit. By setting the input node as a high-impedance effectively eliminates that resistor from the circuit.

For the temperature detection portion of operation, the circuit operates by microprocessor 20 setting nodes B and C to a high impedance and node A to ground. A high signal from control node D to NAND gate 14 sets the output of NAND gate 14 low which causes capacitor 12 to discharge through the series combination of resistor 10, thermistor 4 and resistor 2. When the capacitor has discharged below the low level threshold trigger point of NAND gate 14 the output of NAND gate 14 goes high charging capacitor 12 until the voltage across capacitor 12 increases beyond the high level thresh hold trigger point of NAND gate 14. This will then set the output of NAND gate 14 low. In this manner the circuit will oscillate dependent upon the resistance of thermistor 4. A square wave at this frequency is provided to Input node E of microprocessor 20. Microprocessor 20 then calculates the frequency of the signal (F1) and utilizes this frequency to determine the ambient temperature.

To calibrate the circuit the steps for determining the ambient temperature are followed however, node A of microprocessor 20 is set at a high impedance. Node B is then set at ground while node C stays at a high impedance. The frequency is provided to input node E. Microprocessor 20 then calculates this frequency (F2). The second phase of the calibration is the same as the first, however nodes A and B are now set at a high impedance and node C is set to ground. The microprocessor then determines the third frequency (F3).

To calculate the actual ambient temperature of the device microprocessor 20 utilizes the formula:

$$temperature=[(F1-F2)/(F3-F2)]*(m+b)$$

Note that m is the slope and b is the intercept resulting from a linear curve fit. The linear curve fit is achieved by varying the temperature of the device and measuring F1, F2, and F3. The above formula is then used to calculate device temperature. The calculated device temperature is then compared to the actual device temperature. If the calculated device temperature does not provide the accuracy required of the device then slope m and intercept b can be adjusted until the desired accuracy is achieved. The curve fit accuracy check is performed while varying all component tolerances to their extremes with a given slope and intercept. This verifies that the A/D will meet the device accuracy requirements.

By using two channel calibration the accuracy of the system is increased allowing the use of any Schmitt trigger gate. These gates are generally free as a number of these gates are present on a chip. These gates are generally required for other functions and therefore the extra gate can be used for this purpose.

Figure 2:
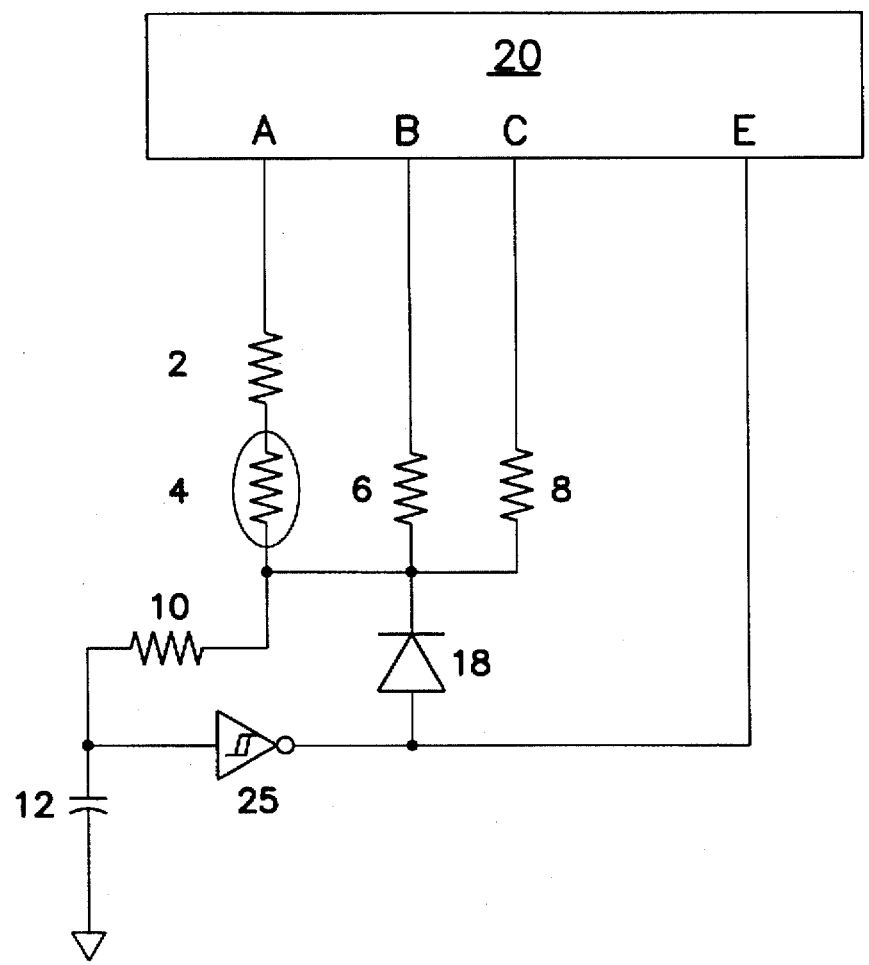
FIG. 2 is the schematic diagram of a second embodiment of preferred embodiment of the invention.

FIG. 2 is the schematic diagram of a second embodiment of the invention. The circuit illustrated in FIG. 2 is similar to that of FIG. 1 with the exception that inverter 16 is eliminated and NAND gate 14 is replaced by Schmitt trigger inverter 25. The output of inverter 25 is provided to input node E directly. Further, the control signal is no longer supplied. The circuit will oscillate continuously and microprocessor 20 can sample the output of inverter 25. To stop the oscillation of the circuit nodes A, B, and C, can all be set at high impedance preventing the discharge of capacitor 12.

I claim:

1. A resistance to frequency converter for determining a resistance value of a resistance means, said resistance to frequency converter having active calibration, said resistance to frequency converter comprising:

a microprocessor having a first tri-state buffer, a second tri-state buffer, a third tri-state buffer, an output node and an input node, said first tri-state buffer, said second tri-state buffer, and said third tri-state buffer having a high state, a low state, and a high impedance state;

resistance means having a first node and a second node, said second node of said resistance means electrically connected to said first tri-state buffer wherein said resistance means comprises a thermistor;

a NAND gate with hysteresis, having a first input, a second input and an output, said second input of said nand gate electrically connected to said input node of said microprocessor, said input node of said microprocessor providing an on/off signal to said nand gate;

an inverter, having an input and an output, said output of said inverter providing said output frequency to said microprocessor input node, said input of said inverter connected to the output node of said NAND gate;

a capacitor with an anode and a cathode, said anode of said capacitor electrically connected to ground, said cathode of said capacitor electrically connected to said input of said nand gate;

a rectifier having an anode and a cathode, said anode of said rectifier electrically connected to said output of said nand gate, said cathode of said rectifier electrically connected to said first node of said resistance means;

a first resistor having a first node and a second node, said first node of said first resistor electrically connected to said input of said nand gate, said second node of said first resistor electrically connected to said cathode of said rectifier;

a first precision resistor having a first node and a second node, said first node of said first precision resistor electrically connected to said cathode of said rectifier, said second node of said first precision resistor electrically connected to a second tri-state buffer; and a second precision resistor having a first node and a second node, said first node of said second precision resistor electrically connected to said cathode of said rectifier, said second node of said precision resistor electrically connected to a third tri-state buffer.

2. A resistance to frequency converter for determining a resistance value of a resistance means, said resistance to frequency converter generating an output frequency, said resistance value being proportionate to said output frequency, said resistance to frequency converter comprising:

resistance means having a first node and a second node, said second node of said resistance means electrically connected to a first tri-state buffer wherein said resistance means comprises a thermistor;

an invertor with hystersis, having an input and an output, said output outputting said output frequency;

a capacitor with an anode and a cathode, said anode of said capacitor electrically connected to ground, said cathode of said capacitor electrically connected to said input of said inverter;

a rectifier having an anode and a cathode, said anode of said rectifier electrically connected to said output of said inverter said cathode of said rectifier electrically connected to said first node of said resistance means;

a first resistor having a first node and a second node, said first node of said first resistor electrically connected to said input of said inverter, said second node of said first resistor electrically connected to said cathode of said rectifier;

a first precision resistor having a first node and a second node, said first node of said first precision resistor electrically connected to said cathode of said rectifier, said second node of said first precision resistor electrically connected to a second tri-state buffer; and a second precision resistor having a first node and a second node, said first node of said second precision resistor electrically connected to said cathode of said rectifier, said second node of said precision resistor electrically connected to a third tri-state buffer.

3. The resistance to frequency converter of claim 1 wherein said resistance means further comprises a second resistor in series with said thermistor.

4. The resistance to frequency converter of claim 2 wherein said resistance means further comprises a second resistor in series with said thermistor.

* * * * *